US008259906B2

(12) United States Patent
Knudson et al.

(10) Patent No.: US 8,259,906 B2
(45) Date of Patent: Sep. 4, 2012

(54) SYSTEM AND METHOD FOR TESTING A DSL AND POTS CONNECTION

(75) Inventors: James T. Knudson, Las Vegas, NV (US); John C. Albertson, Las Vegas, NV (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1017 days.

(21) Appl. No.: 12/235,349

(22) Filed: Sep. 22, 2008

(65) Prior Publication Data

US 2010/0074415 A1 Mar. 25, 2010

(51) Int. Cl.
*H04M 1/24* (2006.01)
*H04M 3/08* (2006.01)
*H04M 3/22* (2006.01)

(52) U.S. Cl. ............ 379/21; 379/1.04; 379/9; 379/15.01
(58) Field of Classification Search ................. 379/1.01, 379/1.03, 1.04, 21, 26.01, 27.01, 29.01, 29.1, 379/9, 15.01
See application file for complete search history.

(56) References Cited

U.S. PATENT DOCUMENTS

| | | | |
|---|---|---|---|
| 5,193,108 A * | 3/1993 | Stocklin ........................... 379/21 |
| 5,592,528 A * | 1/1997 | Nelson et al. .................... 379/21 |
| 5,946,373 A | 8/1999 | Harris |
| 5,956,385 A * | 9/1999 | Soto et al. ................... 379/27.01 |
| 6,301,337 B1 | 10/2001 | Scholtz et al. |
| 6,330,306 B1* | 12/2001 | Brown ............................. 379/21 |
| 6,618,469 B2 * | 9/2003 | Wang et al. .................... 379/1.01 |
| 6,819,745 B2 | 11/2004 | Hollenbeck et al. |
| 7,577,238 B2* | 8/2009 | Small et al. ...................... 379/21 |
| 7,587,029 B2 * | 9/2009 | Pepper et al. ................... 379/21 |
| 2001/0046212 A1 | 11/2001 | Nakajima |
| 2003/0039207 A1 | 2/2003 | Maeda et al. |
| 2004/0008988 A1 | 1/2004 | Gerstal et al. |
| 2004/0170128 A1 | 9/2004 | Takamichi |
| 2005/0099954 A1 | 5/2005 | Mohan et al. |
| 2005/0099955 A1 | 5/2005 | Mohan et al. |
| 2005/0122908 A1 | 6/2005 | Soumiya et al. |
| 2005/0249119 A1 | 11/2005 | Elie-Dit-Cosaque et al. |
| 2006/0126503 A1 | 6/2006 | Huck et al. |
| 2007/0230358 A1 | 10/2007 | Narayanan et al. |
| 2008/0019363 A1 | 1/2008 | Kitajima |

(Continued)

OTHER PUBLICATIONS

Non-Final Office Action date mailed Aug. 23, 2010 for U.S. Appl. No. 12/323,804.

(Continued)

*Primary Examiner* — Binh Tieu
(74) *Attorney, Agent, or Firm* — Swanson & Bratschun, L.L.C.

(57) ABSTRACT

A handset test adapter includes a telephone jack operable to receive a cord for testing a communications connection. The communications connection being POTS or DSL service. The handset test adapter includes a switch in communication with the telephone jack and a telephone plug in communication with the switch. The telephone plug is operable to communicate with a handset tester for testing the DSL service. The handset test adapter includes electrical plugs in communication with the switch. The electrical plugs are operable to communicate with the handset tester for testing the POTS. The switch is operable to receive a user selection of POTS or DSL service. The switch connects the telephone jack to the telephone plug in response to the user selection indicating DSL service, and the switch connects the telephone jack to the electrical plugs in response to the user selection indicating POTS.

15 Claims, 5 Drawing Sheets

U.S. PATENT DOCUMENTS

2009/0161562 A1  6/2009  Shah et al.

OTHER PUBLICATIONS

Fluke Networks, "Telecom Text Equipment, Fluke Networks TS1200 ADSL Test Set", 2 pgs., Tecra Tools, Inc., 2007.

Fluke Networks, "TS® 1200 ADSL/POTS Test Set", 2 pgs., Aug. 11, 2008.

Fluke Networks, "TS® 1200 ADSL/POTS Test Set, Datasheet and Literature", 9 pgs., Aug. 8, 2008.

* cited by examiner

SYSTEM AND METHOD FOR TESTING A DSL AND POTS CONNECTION

BACKGROUND

Usage of telecommunications services and products have grown nearly exponentially in recent years. The growth is fostered by improving features and accessibility. Data connections, such as digital subscriber line (DSL), have become increasingly popular. Similarly, plain old telephone service (POTS) continues to be relevant and important to users.

In many cases, POTS and DSL connections are provided through a single cable or twisted pair. As a result, testing each service or functionality becomes substantially more complicated. The connectors, cords, and clips used to test a connection from a test device may be ill-suited to perform most communications tests. For example, a technician may be required to switch between multiple connectors to first test a POTS connection and then a DSL connection. As a result, the testing equipment is easily damaged and does not encourage efficient testing of the different connection types. In some cases, the test equipment does not include features or configurations that are easily used by technicians in the field.

SUMMARY

One embodiment provides a handset test adapter. The handset test adapter may include a telephone jack operable to receive a cord for testing a communications connection. The communications connection being POTS or DSL service. The handset test adapter may include a switch in communication with the telephone jack and a telephone plug in communication with the switch. The telephone plug may be operable to communicate with a handset tester for testing the DSL service. The handset test adapter may include electrical plugs in communication with the switch. The electrical plugs may be operable to communicate with the handset tester for testing the POTS. The switch may be operable to receive a user selection of POTS or DSL service. The switch may connect the telephone jack to the telephone plug in response to the user selection indicating DSL service. The switch may connect the telephone jack to the electrical plugs in response to the user selection indicating POTS.

Another embodiment provides a handset tester. The handset tester may include testing circuitry operable to test a DSL connection and a POTS connection. The handset tester may further include a telephone jack in communication with the testing circuitry, the telephone jack operable to receive a cord for testing a communications connection. The communications connection may be a POTS or DSL service. The handset tester may further include a switch in communication with the telephone jack. The handset tester may further include a telephone plug in communication with the switch. The telephone plug may be operable to communicate with the testing circuitry for testing the DSL service. The handset tester may further include electrical plugs in communication with the switch. The electrical plugs may be operable to communicate with the testing circuitry for testing the POTS. The switch may be operable to receive a user selection of POTS or DSL service. The switch may connect the telephone jack to the telephone plug in response to the user selection indicating DSL service. The switch may connect the telephone jack to the electrical plugs in response to the user selection indicating POTS.

Yet another embodiment includes a method for testing a communications connection utilizing a test adapter. A selection of a POTS or DSL service is received. A signal is received from the communications connection. A pair of testing jacks in communication with a handset tester is linked to the communications connection for communication of the signal in response to the selection being POTS. A connector in communication with the handset tester is linked to the communications connection for communication of the signal in response to the selection being DSL service.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

An illustrative embodiment provides a system, method, and adapter for performing POTS testing and DSL testing. Testing for POTS and DSL connections are necessary to ensure proper performance and installation for new and existing telecommunications service customers. Testing for POTS and DSL connections may require a technician or user to run different test scenarios and checks utilizing a handset tester.

A handset tester is a portable telecommunications testing device configured to test communications services and connections. In one embodiment, the handset tester may be utilized to test the attenuation, max download and upload speeds, IP address acquisition, error rates, and other similar characteristics of a DSL connection. Similarly, the handset tester may test noise, balance power influence, loss and any number of other characteristics for a POTS connection. In particular, the POTS and DSL testing may utilize and test different voltages, currents, capacitance, resistance, attenuation, or other characteristics of the signal carried by the DSL or POTS line. As a result, some handset tester manufacturers utilize separate modules, ports and cords to test POTS and DSL connections.

The separation of testing features of the handset tester may force technicians, engineers, and other network verification personnel to separately connect to and test the distinct types of connections. Existing handset testing technologies utilize separate cords, connectors, or interfaces for each of the DSL and POTS ports of the handset tester. In one embodiment, a test adapter may allow a user to more efficiently switch between DSL and POTS testing without utilizing multiple cords or conducting mediums.

Figure 1:
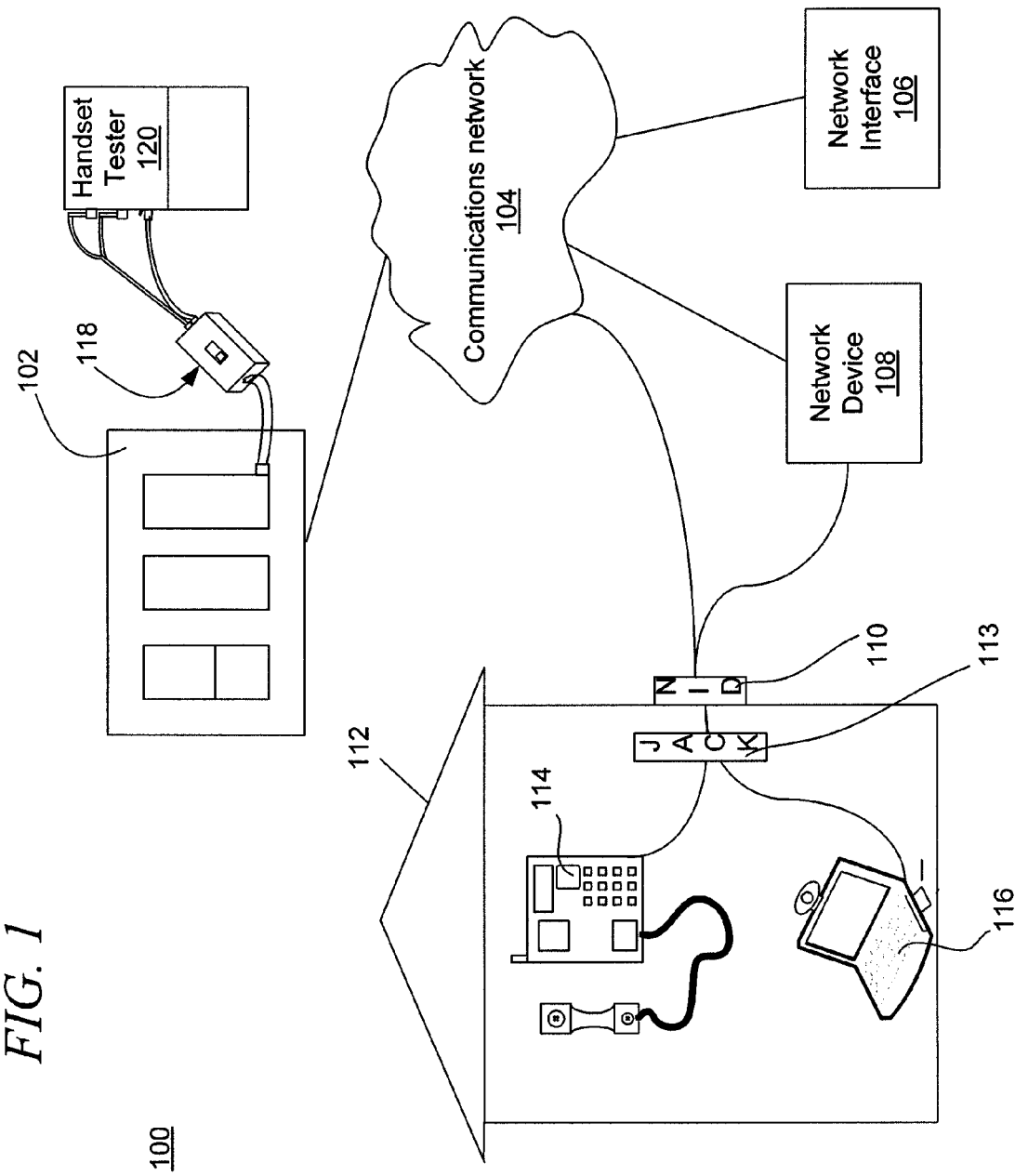
FIG. 1 is a pictorial representation of a testing environment in accordance with an illustrative embodiment.

FIG. 1 is a pictorial representation of a testing environment in accordance with an illustrative embodiment. FIG. 1 illustrates one embodiment of a testing environment 100. The testing environment 100 is the network, devices, elements, and location in which testing of a DSL or POTS connection occurs. The testing environment 100 may include any number of communications networks run by one or more communication service providers. The testing environment 100 may also include any number of homes, organizations, or businesses that utilize DSL or POTS services and connections.

In one embodiment, the testing environment 100 may include a central office 102, a communications network 104, a network interface 106, a network device 108, a network interface device (NID) 110, a customer's premises 112, a jack 113, a telephone 114, a computer 116, test adapter 118, and handset tester 120. The testing environment 100 may include any number of other elements utilized by a communications service provider to operate a communications network that are not shown herein for purposes of simplicity.

The central office 102 is the central location, devices, equipment, and network elements that manage and control communications through the communications network 104. The central office 102 may include any number of routers, switches, storage systems, primary and backup power systems, trunks, lines, connections, servers, databases, mainframe computing and communications equipment, registers, terminals, broadcasters, transceivers, network interface devices, and other similar equipment commonly included in a central office.

The central office 102 may include any number of ports, jacks, or connectors that may be utilized to individually or collectively test POTS and DSL connections for users that subscribe to the services offered by a communications service provider. In one embodiment, the test adapter 118 and corresponding handset tester 120 is connected to a jack within the central office 102 for testing a DSL or POTS connection. Alternatively, the test adapter 118 may be connected to any number of other devices, connections, or elements within the testing environment 100 in order to test connections, services, and devices.

The central office 102 may supply POTS to a circuit feeding one or more users. As a result, a technician may interface to verify the POTS connection leaving the central office through the handset tester 120. The central office 102 may further include a digital subscriber line access multiplexer (DSLAM). The DSLAM may provide a DSL signal to one or more circuits feeding a user. The DSLAM may include an interface to verify functioning DSL service is leaving the correct port through test sequences implemented by the handset tester 120. The POTS and DSL signals may be connected by a frame of the central office 102 for feeding the signals to the user through an office pair. The office pair is the initial pair feeding the signals from the central office 102 to a distribution point or terminal. A wire pair called a jumper may connect the different signals with the POTS, DSL, and frame connections.

The communications network 104 is the devices and connections that enable electronic communications between one or more users. In one embodiment, the communications network 104 may connect to any number of other communications networks in order to route calls, data, traffic, packets, and other types of communication signals. The network interface 106 is a device or location that may be utilized to interface with the communications network 104. The network interface may function as an interconnection between the communications network 104 or local exchange carrier and terminal equipment of the user. A user may verify POTS or DSL connections by connecting to nearly any device or connections within the testing environment 100 with a handset tester 120 utilizing a plug, an RJ-11, RJ-45, alligator clips, or other connection elements.

The communications network 104 may further include any number of elements and devices. For example, the communications network 104 may include one or more terminals. The terminals are centralized locations to connect wire pairs together. The wire pairs may be aerial or buried and a typical connection path to a user may pass through numerous terminals to complete a communications circuit. Within one or more terminals, a field pair may connect to the office pair or another field pair. A drop is the cable feeding from the final terminal in the communications circuit to the customer's premises 112 and particularly to the network interface device 110.

The network device 108 is a device configured to provide communications services to one or more users. For example, the network device may be a terminal. In another example, the network device 108 may function as a repeater or router for data or packet traffic utilized by devices within the customer's premises 112. The network interface device 110 is the interface or demarcation point between the communications network 104 and the user's wiring and devices. For example, everything outside of the customer's premises 112, including the network interface device 110 and other circuits, may be owned and operated by a communications service provider operating the central office 102 and the communications network 104 and all other associated devices, connections, and elements. All connections and devices within the customer's premises 112 may be owned and operated by a user. As a result, the user has responsibility for all problems that occur within the customer's premises 112 or beyond the network interface device 110.

The customer's premises 112 is a representation of a location utilized by one or more users. The customer's premises 112 may also be an organization, business, location or communications and computing devices utilized by one or more users. For example, the customer's premises 112 may also represent a user temporarily accessing data communication services, within a mobile home, newsstand, convention, or school. The customer's premises utilizes inside wire or cable feeding from the network interface device 110 to the jack 113. The inside wire or cabling typically includes between two and four pairs of wire, each of which is capable of transporting POTS and/or DSL signals. The customer's premises 112 may be wired so that the POTS and DSL connections may be utilized at the jack 113. The jack 113 is a final connecting point feeding POTS and/or DSL signals. The jack 113 may be connected to the telephone 114, as well as the computer. Additionally, other devices, such as modems, fax machines, credit card machines, and other equipment may be communicated through the jack 113.

The jack 113 represents on or more phone jacks, splitters, and other connections that may be utilized by the telephone 114, computer, and other communications devices to communicate the POTS and/or DSL signals. The test adapter 118 may be connected to the jack 113 so that a number of POTS or DSL specific tests may be run by the handset tester 120 on the connection and circuitry that communicate back to the central office 102. The telephone 114 is a communications device configured to utilize a POTS connection for voice communications.

The computer 116 is a data processing device configured to utilize a data connection, such as a DSL connection from the network interface device 110. In one embodiment, the test adapter 118 herein described, may be utilized to test the DSL or POTS connections to the customer's premises 112 from within the customer's premises 112, at the network interface device 110 or at the network device 108, network interface 106, communications network 104, or the central office 102. A user may test the DSL or POTS connections from any interface point suitable for receiving a telephone plug or suitable connector.

Figure 2:
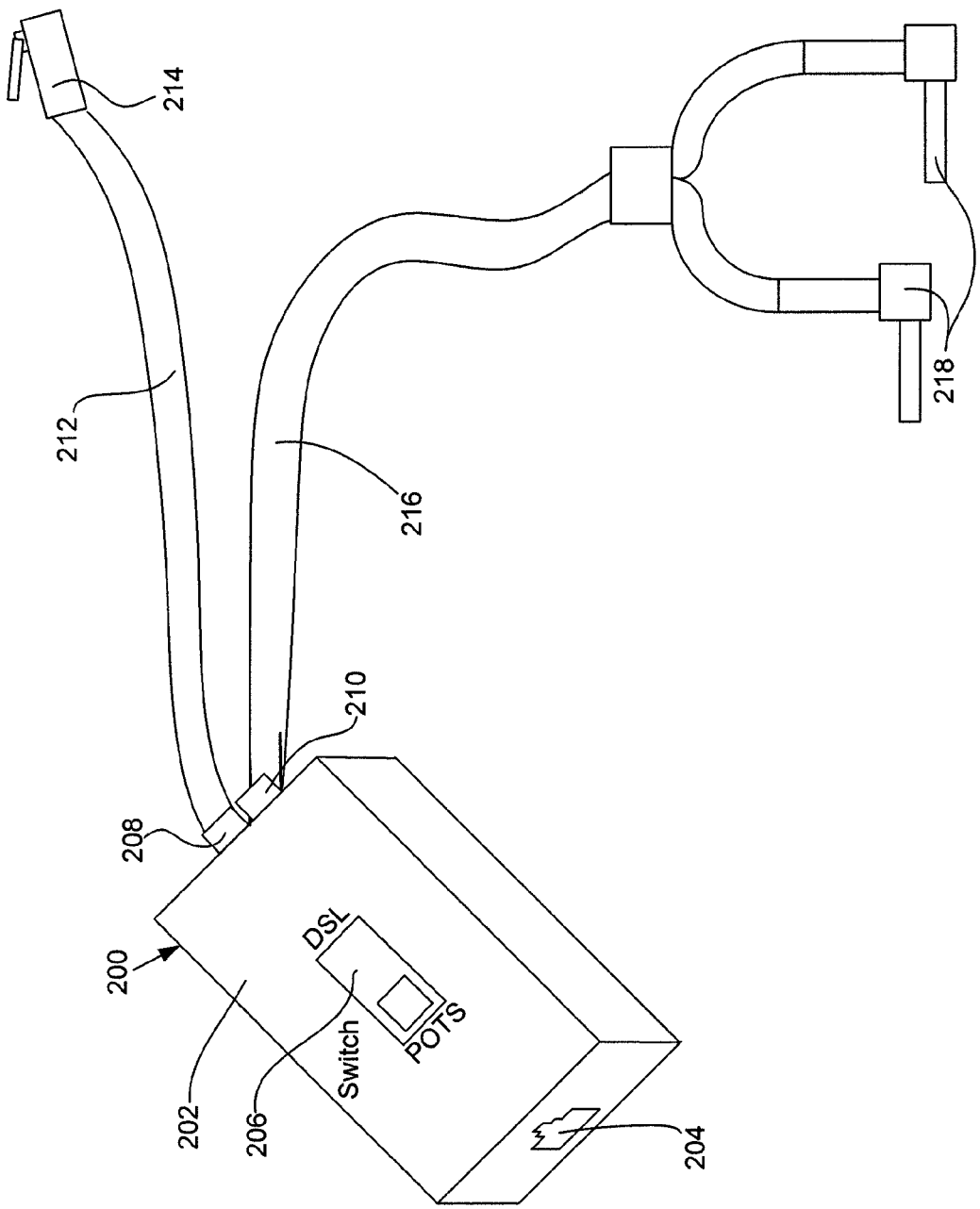
FIG. 2 is a pictorial representation of a test adapter in accordance with an illustrative embodiment.

FIG. 2 is a pictorial representation of a test adapter 200 in accordance with an illustrative embodiment. The test adapter 200 is a particular implementation of the test adapter 118 of FIG. 1. The test adapter 200 may include any number of elements. In one embodiment, the test adapter includes a frame 202, telephone jack 204, switch 206, interfaces 208 and 210, DSL cord 212, Ethernet plug 214, POTS cord 216, and banana plugs 218.

The Ethernet plug 214 and the banana plugs 218 are embodiments of conductors that communicate the communications signals utilized for the purpose of illustration. The Ethernet plug 214 and the banana plugs 218 may be any electrical connector, socket conductor, or plug suitable for transporting communications signals. The Ethernet plug 214 and the banana plugs 218 may also be male or female mini plugs, RCA plugs, compression connectors, locking connectors, socket connectors, 8P8C connectors, or other similar electrical interfaces.

The frame 202 is the housing for the switch 206, the interfaces 208 and 210 and the telephone jack 204. The frame 202 may house the wires, cables, conductors, or other elements that connect pins and lines of the telephone jack 204 to the Ethernet plug 214 and the banana plugs 218, respectively. The frame 202 may be configured in any number of shapes or dimensions. In one embodiment, the frame 202 is a small rectangular device with rounded edges that may be easily stowed in a utility bag. In another embodiment, the frame 202 may be cylindrically shaped and include a clip for allowing the test adapter 200 to be attached to a pocket, bag, handset tester, user, or other test element.

The telephone jack 204 is the interface for receiving a telephone plug utilized to test a POTS or DSL connection. In one embodiment, the switch 206 is a mechanical device utilized to electrically connect and disconnect the telephone jack 204 to the Ethernet plug 214 or the banana plugs 218 based on a user selection. Alternatively, the switch may be a softswitch or an electrical or electromechanical device. In one embodiment, the switch 206 is a dual pull, dual throw switch configured to test a DSL or POTS connection. The switch 206 may include an indication, marking, lettering, or symbols that indicate whether the test adapter 200 is currently set to test a DSL or POTS connection. The switch 206 may be a toggle, pushbutton, selector, joystick, or other switch type, or configuration that allows the user to select between testing a DSL connection through the DSL cord 212, Ethernet plug 214, POTS cord 216, and banana plugs 218. In one embodiment, the switch 206 may receive a user selection to test a specified connection type based on a thumb selection made by the user.

The switch 206 may be configured to electrically connect the tip and ring portions of the Ethernet plug 214 and banana plugs 218 to the handset tester to complete a circuit for testing a DSL or POTS line, respectively. In one embodiment, the DSL cord 212 and the POTS cord 216 may be hardwired to the frame 202 and electronic elements of the frame 202.

In another embodiment, the DSL cord 212 and the POTS cord 216 may connect to the frame 202 through interfaces 208 and 210. The interfaces 208 and 210 may be removable jacks or plugs. In one embodiment, the interfaces 208 and 210 are breakaway access points to the rest of the test adapter 200 ensuring that if the DSL cord 212, Ethernet plug 214, POTS cord 216, or banana plugs 218 are snagged or caught on something they do not ruin all or portions of the test adapter 200 based on the induced pressure or stress. Instead the interfaces 208 and 210 may allow the DSL cord 212 and POTS cord 216 to break away from the frame 202 of the test adapter 200 to be easily reconnected or repaired at a later time. In one embodiment, the interfaces 208 and 210 may be easily replaced to ensure a good connection that does not significantly affect the tests run by a handset tester through the test adapter 200.

The DSL cord 212 and POTS cord 216 are the conductors that communicate DSL and POTS signals to the Ethernet plug 214 and the banana plugs 218, respectively. The DSL cord 212 and the POTS cord 216 may be of any length. In one embodiment, interchangeable connector lengths for the DSL cord 212 and POTS cord 216, such as twelve, eighteen, and twenty four inches, may be attached utilizing the interfaces 208 and 210 for different testing applications.

The Ethernet plug 214 may be connected to the handset tester for testing the DSL connection. The banana plugs 218 may be connected to the handset tester for testing the POTS connection. In one embodiment, the Ethernet plug 214 is an RJ-45 head. The separation of the Ethernet plug 214 from the banana plugs 218 may be required for some handset testers in the event that a high voltage is applied through the POTS cord 216 in order to perform any number of tests that may damage the DSL testing circuitry of the handset tester. The test adapter 200 may allow a technician or other user to carry around less cables, adapters or other elements for use with the handset tester.

In one embodiment, the test adapter 200 may be integrated within the handset tester. As a result, the switch 206 may be accessible on a surface of the handset tester for changing between DSL and POTS connections. If the test adapter 200 is integrated with a handset tester, the DSL cord 212, and POTS cord 216 may represent internal connections, including wire traces and the Ethernet plug 214 and banana plugs 218 may represent interfaces to the DSL and POTS testing circuitry, respectively. In another embodiment, the DSL cord 212 and the POTS cord 216 may be hardwired to testing circuitry of the handset tester. The integrated embodiment may include any number of break-away interfaces between the DSL cord 212, POTS cord 216, frame 202, and handset tester. The testing circuitry may include one or more modules, including the hardware and software for testing the DSL and POTS connections.

Figure 3:
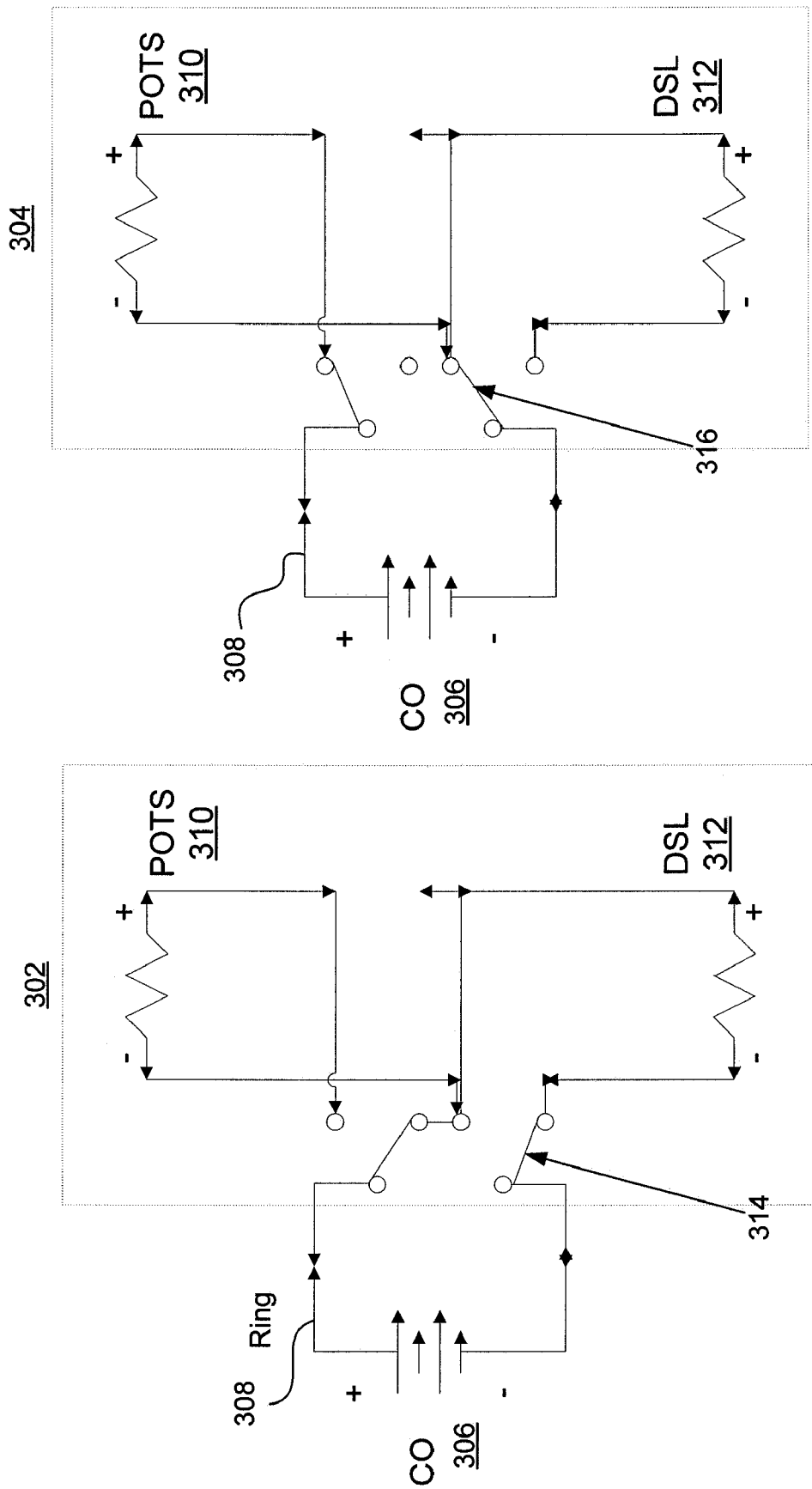
FIG. 3 illustrates configurations of a circuit diagram of the test adapter in accordance with an illustrative embodiment.

FIG. 3 illustrates configurations of a circuit diagram of the test adapter in accordance with an illustrative embodiment. FIG. 3 includes various illustrative elements including a DSL configuration 302, a POTS configuration 304, a central office 306, a ring connection 308, POTS testing circuitry 310, DSL testing circuitry 312, and the switch configurations 314 and 316. The elements of the test adapter are represented by the dotted line around the DSL configuration 302 and the POTS configuration 304. The DSL configuration 302 and the POTS configuration 304 are a particular embodiment of the test adapter 200 and a handset tester of FIG. 2.

The POTS testing circuitry 310 is the testing hardware and software utilized by the handset tester to test the POTS connection. Similarly, the DSL testing circuitry 312 is the hardware and software utilized by the handset tester to test the DSL connection. The POTS testing circuitry 310 and the DSL testing circuitry 312 are represented as resistors. However, one skilled in the art will understand that the testing circuitry includes numerous elements which may include amplifiers, digital logic, buffers, transistors, wire traces, integrated circuits, and other elements commonly used in handset testers.

The switch configurations 314 and 316 show how the switch of the test adapter may be configured to test the connections and services from the central office 306 through the DSL testing circuitry 312 and the POTS testing circuitry 310, respectively. As shown, the ring 308 portion of the connection is communicated to the DSL testing circuitry 312 based on the switch configuration 314 in the DSL configuration 302 and the ring 308 portion of the connection may be utilized to connect to the POTS testing circuitry 310 with the switch configuration 316 in the POTS configuration 304.

Figure 4:
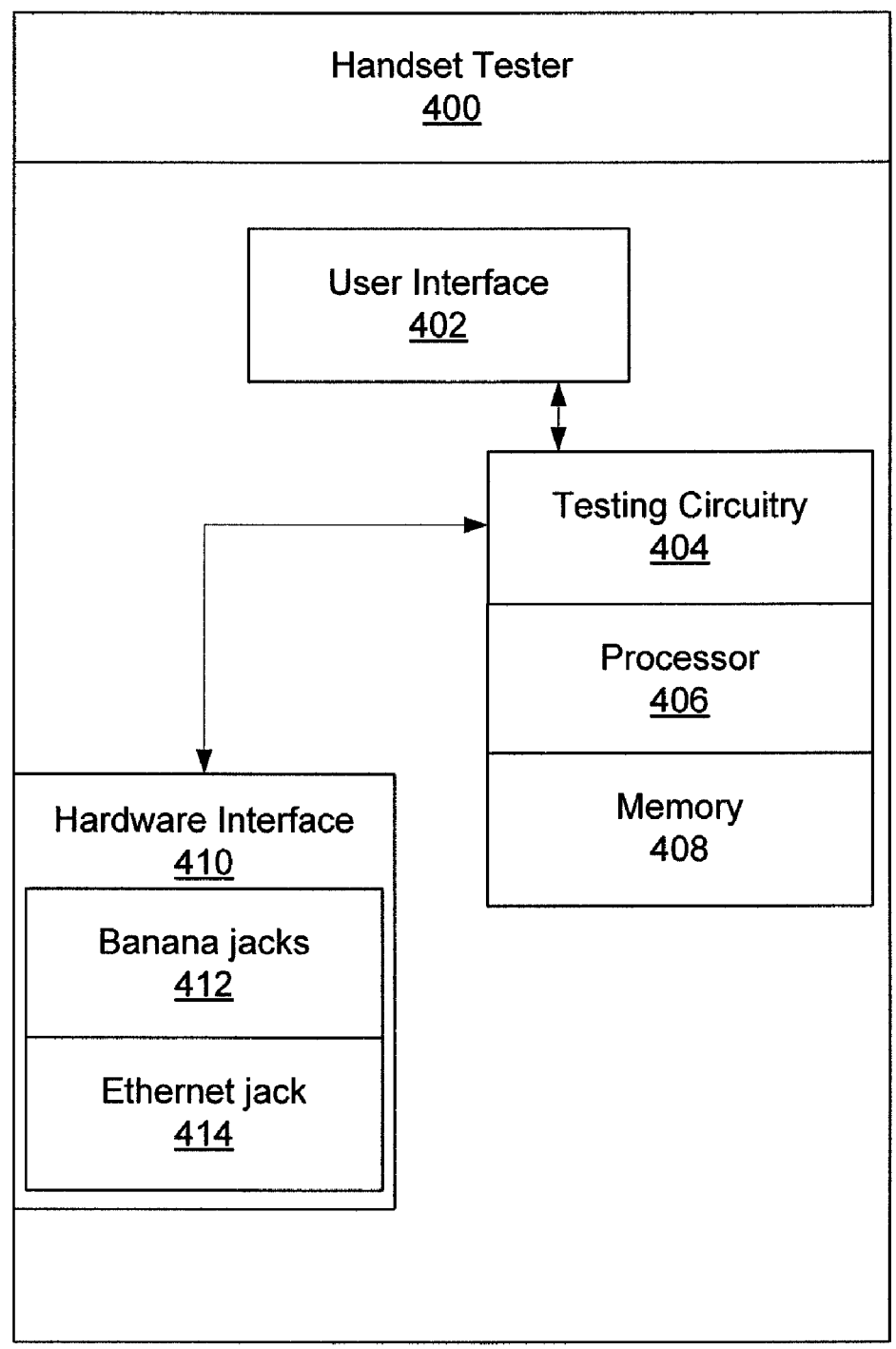
FIG. 4 is a block diagram of a handset tester in accordance with an illustrative embodiment.

FIG. 4 is a block diagram of a handset tester 400 in accordance with an illustrative embodiment. The handset tester 400 is a particular implementation of the handset tester 120 of FIG. 1. The handset tester 400 may include various elements including a user interface 402, testing circuitry 404, a processor 406, a memory 408, a hardware interface 410, banana jacks 412, and an Ethernet jack 414.

The user interface 402 is the interactive element for displaying information to a user and receiving user input. The user interface 402 may include a screen or display for outputting information related to DSL, POTS, or other telecommunications tests. The user interface 402 may further include any number of buttons, switches, knobs, scroll wheels, touch screens, or other interactive elements that allow the user to enter data, receive user feedback, or otherwise interact with the handset tester 400.

The testing circuitry 404 is the circuitry for testing a communications connection or circuit. In one embodiment, the testing circuitry 404 includes the resisters, capacitors, transistors, and digital logic for testing POTS and DSL connections. In particular, the test adapter, as previously described may allow the testing circuitry 404 to more effectively test a DSL or POTS connection. The testing circuitry 404 or the memory may further store algorithms, protocols, applications, or other instructions for testing DSL or POTS services.

The processor 406 is circuitry or logic enabled to control execution of a set of instructions. The processor 406 may be a microprocessor, digital signal processor, central processing unit, or other device suitable for controlling an electronic device including one or more hardware and software elements, executing software, instructions, programs, and applications, converting and processing signals and information, and performing other related tasks. The processor 406 may be a single chip or integrated with other computing or communications elements. The processor 406 may be configured to process signals and test results received from the testing circuitry 404 for output through the user interface 402 or other interconnected devices.

The memory 408 is a hardware element, device, or recording media configured to store data for subsequent retrieval or access at a later time. The memory 408 may be static or dynamic memory. The memory 408 may include a hard disk, random access memory, cache, removable media drive, mass storage, or configuration suitable as storage for data, instructions, and information. In one embodiment, the memory 408 and processor 406 may be integrated. The memory may use any type of volatile or non-volatile storage techniques and mediums. In one embodiment, the memory 408 may store test results, user preferences, custom testing parameters, and other similar data and information.

The hardware interface 410 is the hardware for receiving input from one or more plugs. In particular, the hardware interface 410 may receive input from banana plugs, an Ethernet plug, or RJ-45 head. The banana jacks 412 is a jack configured to receive banana plugs for POTS testing. The Ethernet jack 414 is a jack configured to receive a connection for DSL testing.

In one embodiment, the handset tester 400 is a JDSU HST-3000 or similar testing device. The handset tester 400 may also include all or portions of the test adapter as described in FIG. 3. For example, in one embodiment, the handset tester 400 may include a switch for selecting between a POTS and DSL connection. The switch may sit between the hardware interface 410 and the testing circuitry 404 in order to allow the user to select a POTS or DSL connection or test as needed.

Figure 5:
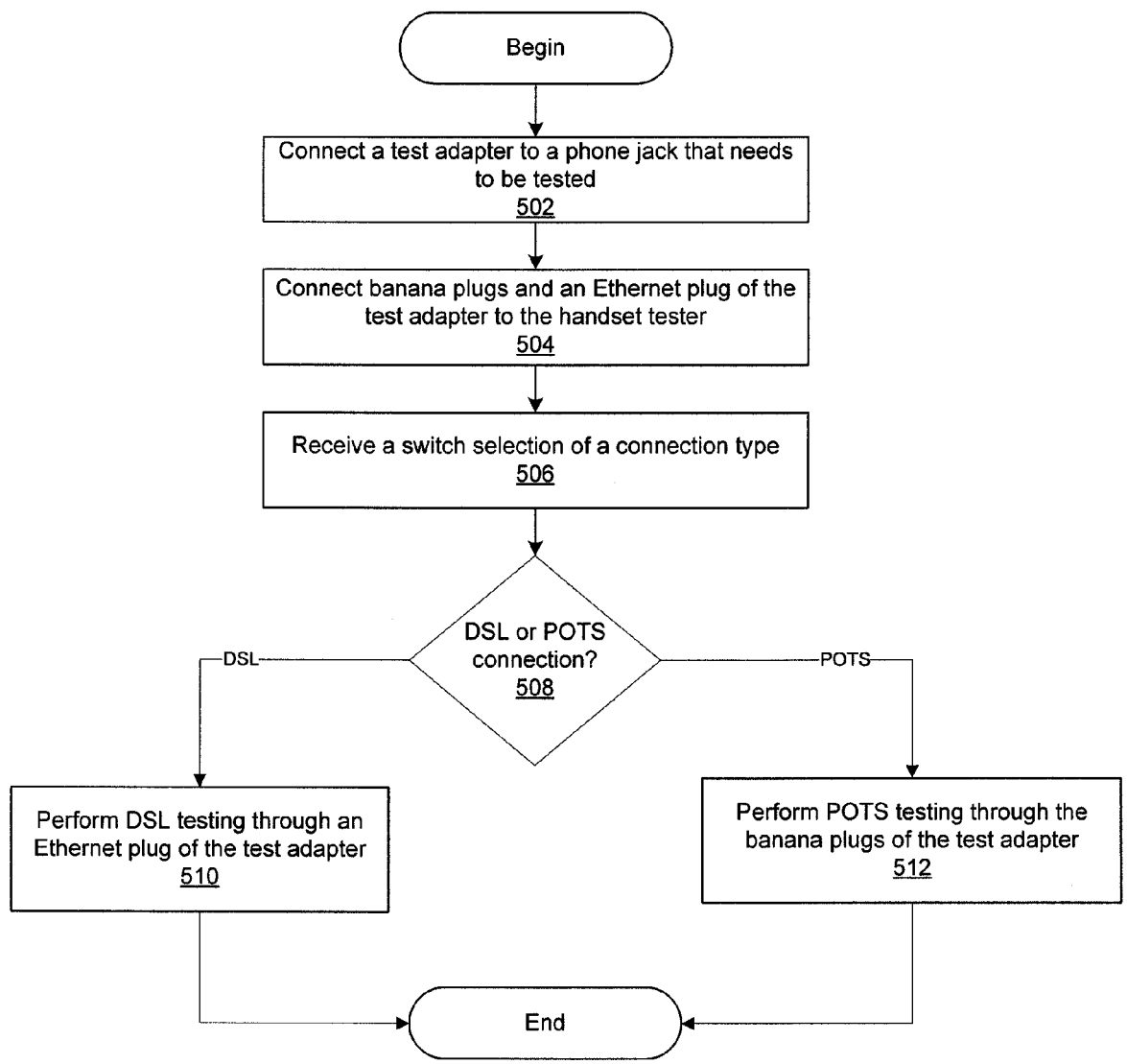
FIG. 5 is a flowchart of a process for utilizing a handset tester and test adapter in accordance with an illustrative embodiment.

FIG. 5 is a flowchart of a process for utilizing a handset tester and test adapter in accordance with an illustrative embodiment. The process of FIG. 5 may be implemented by a user utilizing a handset tester and a test adapter as herein described. The process of FIG. 5 may begin by connecting a test adapter to a phone jack that needs to be tested (step 502). The phone jack may be connected to the test adapter using a telephone cord with male telephone plugs on each end or other similar connection cords. However, the test adapter may be connected to the phone jack, cord, or conductor in utilizing any cord, clips, or conductor suitable for transmission of the communication signal.

Next, the user connects banana plugs and an Ethernet plug of the test adapter to the handset tester (step 504). In another embodiment, the banana plugs and Ethernet plug may have previously been connected to the handset tester. Alternatively, the handset tester may be integrated with the test adapter so that only a connection to the phone jack needs to be established in order to perform the DSL or POTS testing.

In one embodiment, icons or indicators integrated with the test adapter or handset tester may indicate that the Ethernet plug and the banana plugs are connected to the handset tester. Similarly, the test adapter may include an LED or other indicator that notifies the user that the test adapter is connected to a live phone jack and ready for POTS or DSL testing. The test adapter may indicate whether a POTS communications signal, DSL communications signal, or both are detected by the test adapter. In one embodiment, the test adapter may include circuitry and a battery operable to illuminate the indicator, information, or data to a user. The test adapter may also indicate whether the switch is correctly set or positioned to test a DSL or POTS connection.

In another embodiment, the test adapter may include a fuse, switch, or logic operable to disconnect the test adapter from the handset tester in response to detecting that the switch is not properly set to test a corresponding POTS or DSL connection. As a result, the test adapter may not conduct a communications signal if the test adapter is not properly configured in order to protect the testing modules and circuitry within the handset tester.

Next, the test adapter receives a switch selection of a connection type (step 506). The switch selection may include the user mechanically manipulating a switch of the test adapter between two or more positions. In one embodiment, the switch selections may include POTS, DSL, and unselected. The switch may be activated using a toggle, or thumb switch, or other interface element that physically manipulates the switch.

Next, the test adapter determines whether there is a DSL or POTS connection (step 508). The determination of step 508 may be made based on the switch selection received during step 506. If the user has selected a DSL connection, the handset tester performs DSL testing through an Ethernet plug of the test adapter (step 510). If the user has selected a POTS connection during step 508, the handset tester performs POTS testing through the banana plugs of the test adapter (step 512).

The illustrative embodiments may allow a user to efficiently test POTS or DSL connections without carrying or utilizing multiple test cords. A user may easily switch between testing POTS and DSL connections and services without worrying about connecting multiple cords to a test jack and the handset tester. As a result, the user may be spared from environmental conditions, such as heat, weather, or rain that are common in the testing environment and may be able to more effectively test numerous DSL and POTS connections saving time, money, and effort. Similarly, the user is not required to use expensive proprietary cords of the handset manufacturer that may be inconvenient to use and easily damaged. The test adapter may be utilized without reconfiguring single inline module (SIM) modules utilized by the handset tester to perform POTS and DSL testing.

The previous detailed description is of a small number of embodiments for implementing the invention and is not intended to be limiting in scope. The following claims set forth a number of the embodiments of the invention disclosed with greater particularity.

What is claimed:

1. A handset test adapter, the adapter comprising:
   a telephone jack operable to receive a cord for testing a communications connection, the communications connection being plain old telephone service (POTS) or digital subscriber line (DSL) service;
   a switch in communication with the telephone jack;
   a telephone plug in communication with the switch, the telephone plug operable to communicate with a handset tester for testing the DSL service; and
   electrical plugs in communication with the switch, the electrical plugs operable to communicate with the handset tester for testing the POTS, wherein the switch is operable to receive a user selection of POTS or DSL service, the switch connects the telephone jack to the telephone plug in response to the user selection indicating DSL service, and the switch connects the telephone jack to the electrical plugs in response to the user selection indicating POTS.

2. The handset test adapter according to claim 1, wherein the telephone plug is an RJ-45 connector, and wherein the telephone jack is an RJ-11 jack.

3. The handset test adapter according to claim 1, wherein the electrical plugs are banana plugs.

4. The adapter according to claim 1, wherein handset tester is a mobile tester utilized to test performance of POTS and DSL connections.

5. The handset test adapter according to claim 4, wherein the handset tester includes separate ports for receiving the electrical plugs and the telephone plug for testing the POTS and DSL service, respectively.

6. The handset test adapter according to claim 1, wherein the switch indicates whether the handset test adapter is operable to test the POTS or the DSL service.

7. The handset test adapter according to claim 1, further comprising:
   an indicator in communication with the switch that indicates whether the telephone jack is connected to the POTS, the DSL service, or both the POTS and DSL service.

8. The handset test adapter according to claim 1, a plurality of interfaces in communication with the switch and the telephone plug and the electrical plugs, the plurality of interfaces configured to allow cords in communication with the telephone plug and the electrical plugs to break away without ruining the handset test adapter.

9. The handset test adapter according to claim 8, wherein the cords are of varying lengths, wherein the cords are selected based on a location of the testing for the POTS and DSL service.

10. The handset test adapter according to claim 1, wherein the handset test adapter is operable to test POTS and DSL service in a customer's premises, in a field location, and in a central office.

11. A method for testing a communications connection utilizing a test adapter, the method comprising:
   providing a handset test adapter;
   providing a switch associated with the handset test adapter, the switch providing for a selection between plain old telephone service (POTS) or digital subscriber line (DSL) service;
   receiving a switch selection of plain old telephone service (POTS) or digital subscriber line (DSL) service;
   receiving a signal from the communications connection at a telephone jack associated with the handset test adapter;
   linking a pair of testing jacks associated with the handset test adapter into communication with the communications connection in response to the switch selection being POTS;
   linking a connector associated with the handset test adapter into communication with the communications connection in response to the switch selection being DSL service; and
   connecting at least one of the pair of testing jacks and the connector to a handset tester that is separate from the handset test adapter.

12. The method according to claim 11, wherein the testing jacks are configured to receive electrical plugs from the test adapter for testing the POTS, and wherein the connector is an Ethernet jack configured to receive an Ethernet plug from the test adapter for testing the DSL service.

13. The method according to claim 11, wherein the selection is positioning of a manual switch to test POTS or the DSL service.

14. The method according to claim 11, further comprising:
   indicating whether the communications connection includes the POTS, the DSL service, or a both the POTS and the DSL service.

15. The method according to claim 11, further comprising:
   performing one or more tests on the POTS and DSL service with the handset tester.

* * * * *